US008768146B2

(12) United States Patent
Wagner et al.

(10) Patent No.: US 8,768,146 B2
(45) Date of Patent: Jul. 1, 2014

(54) STRATEGIES FOR CONTROLLING PRESENTATION OF MEDIA INFORMATION BASED ON A SAMPLING OF CUSTOMER PLAYBACK BEHAVIOR

(75) Inventors: Mark Wagner, Seattle, WA (US);
Thomas H. Taylor, Redmond, WA (US);
Peter J. Potrebic, Calistoga, CA (US);
Landon M. Dyer, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 1676 days.

(21) Appl. No.: 11/256,863

(22) Filed: Oct. 24, 2005

(65) Prior Publication Data
US 2007/0092204 A1   Apr. 26, 2007

(51) Int. Cl.
*H04N 5/761* (2006.01)
(52) U.S. Cl.
USPC .......................................... 386/290; 386/278
(58) Field of Classification Search
USPC ............................................................ 386/46
See application file for complete search history.

(56) References Cited

U.S. PATENT DOCUMENTS

| 6,798,971 | B2 | 9/2004 | Potrebic |
| 6,804,824 | B1 | 10/2004 | Potrebic et al. |
| 6,897,904 | B2 | 5/2005 | Potrebic et al. |
| 7,565,672 | B2 * | 7/2009 | Yun .................................. 725/46 |
| 2001/0052130 | A1 | 12/2001 | Yap et al. |
| 2002/0108126 | A1 | 8/2002 | Horowitz et al. |
| 2002/0110352 | A1 | 8/2002 | Potrebic |
| 2002/0110353 | A1 | 8/2002 | Potrebic et al. |
| 2002/0110360 | A1 | 8/2002 | Potrebic |
| 2003/0093790 | A1 * | 5/2003 | Logan et al. .................... 725/38 |
| 2003/0128302 | A1 | 7/2003 | Potrebic et al. |
| 2003/0198461 | A1 | 10/2003 | Taylor et al. |
| 2003/0212708 | A1 | 11/2003 | Potrebic et al. |
| 2004/0013409 | A1 * | 1/2004 | Beach et al. .................... 386/83 |
| 2004/0078817 | A1 | 4/2004 | Horowitz et al. |
| 2004/0244030 | A1 | 12/2004 | Boyce et al. |

(Continued)

FOREIGN PATENT DOCUMENTS

| JP | 2004023326 | 1/2004 |
| WO | WO 03067594 | 8/2003 |
| WO | WO 2004053842 | 6/2004 |

OTHER PUBLICATIONS

"Flex Watch Network Storage Server (NSS-1016)," available at <<http://www.remote-security.com/fwstorage.htm>>, accessed on Dec. 1, 2005, 3 pages.

(Continued)

*Primary Examiner* — William C Vaughn, Jr.
*Assistant Examiner* — Eileen Adams
(74) *Attorney, Agent, or Firm* — Micah P. Goldsmith; Glen Johnson; Micky Minhas

(57) ABSTRACT

Functionality is described for controlling the playback of a recorded media program. The functionality formulates initial playback decisions that govern the playback of the program based on a set of initial assumptions. The functionality then formulates modified playback decisions that define the manner in which the program should actually be played back. The modified playback decisions can be formed based on the playback-related behavior of a population of users who have previously consumed the same program. The functionality makes modifications which affect the playback of the recorded program based on the modified playback decisions, such as by bookmarking or truncating the recorded program.

18 Claims, 9 Drawing Sheets

(56) References Cited

U.S. PATENT DOCUMENTS

| | | |
|---|---|---|
| 2005/0025469 A1 | 2/2005 | Geer et al. |
| 2005/0073613 A1 | 4/2005 | Potrebic et al. |
| 2005/0237435 A1 | 10/2005 | Potrebic et al. |
| 2005/0238315 A1* | 10/2005 | Kataoka .......... 386/46 |
| 2006/0020973 A1* | 1/2006 | Hannum et al. ........ 725/46 |
| 2006/0031883 A1* | 2/2006 | Ellis et al. .......... 725/58 |
| 2006/0064721 A1* | 3/2006 | Del Val et al. .......... 725/41 |
| 2006/0107281 A1* | 5/2006 | Dunton .......... 725/11 |
| 2006/0222335 A1* | 10/2006 | Russ .......... 386/95 |
| 2006/0253886 A1* | 11/2006 | Khurana et al. .......... 725/118 |

OTHER PUBLICATIONS

Ochiva, "Potent Storage," available at <<http://www.findarticles.com/p/articles/mi_m0HFE/is_g_30/ai_n6072716/print>>, accessed on Dec. 1, 2005, 4 pages.

"Denon to launch 'Multi-Media Server'," available at <<http://www.pvruk.com/2004/06/denon_to_launch.html>>, accessed on Dec. 1, 2005, pp. 2,3 of 4.

"Boundless Security System," available at <<http: www.boundlesss.com/contact.html>>, accessed on Dec. 1, 2005, 1 page.

* cited by examiner

STRATEGIES FOR CONTROLLING PRESENTATION OF MEDIA INFORMATION BASED ON A SAMPLING OF CUSTOMER PLAYBACK BEHAVIOR

TECHNICAL FIELD

This subject matter relates to strategies for presenting information to users. In a more particular implementation, this subject matter pertains to strategies for controlling the playback of media information to users at respective client devices.

BACKGROUND

Digital recording devices (e.g., DVRs) allow users to record media programs and to play back the media programs at times that are convenient for the users. More specifically, in a typical use scenario, a user identifies a program to be recorded from an electronic program guide (EPG). The DVR device then records the identified program at its scheduled presentation date and time. The DVR commonly records the program in its local store. At a later time, the user can activate the program, at which time the DVR plays the program from its local store.

In actual practice, the EPG data contained in the EPG guide for a program may not exactly coincide with the actual presentation times of the program. For instance, the EPG guide may indicate that a program begins at 8:00 PM and ends at 10:00 PM, but the source which supplies the program may start the program at a time slightly prior to 8:00 PM, or at a time slightly after 8:00 PM. Similarly, the source may potentially end the program at a time slightly prior to 10:00 PM, or at a time slightly after 10:00 PM. Typically these offset times are short, e.g., a few minutes, but these times can also be longer (e.g., in the case of sporting events that last longer than scheduled).

DVR devices are known to account for variation in presentation times by "padding" the starting and ending times of recorded programs. Consider the scenario shown in FIG. 1. As indicated there, EPG data indicates that a program 102 is scheduled to air from 8:00 PM to 10:00 PM. However, to account for the fact that this program 102 may potentially start slightly earlier than 8:00 PM or run slightly later than 10:00 PM, the DVR device can start recording the program 102 at a padded starting time 106, and stop recording the program 102 at a padded ending time 108. In operation, the DVR device will begin playing the program at the padded starting time 106, and will continue playing the program until the padded ending time 108 (unless, of course, the user stops the program 102 before then).

In many (and perhaps most) instances, however, the program may actually start at the scheduled starting time and terminate at the scheduled ending time. These times correspond to the actual starting time 110 and the actual ending time 112. In this scenario, when the user activates the program, the user will be presented with a terminal portion of a program 114 which precedes the program 102 on this channel. And if the user watches all of the recorded content, the user will eventually advance to a program 116 which follows the program 102.

The above-described kind of DVR behavior is disadvantageous for at least three reasons. First, the user may be displeased and/or confused to see the ending part of program 114 when the user activates the program 102. If the user understands why he or she is being presented with the program 114, the user can quickly advance forward in the recorded content to find the actual starting time 110, e.g., by activating a fast forward playback mode. Nevertheless, this operation may be cumbersome, especially if the user is required to frequently perform this operation. Second, the user may also be displeased to see the end of the program 114 because this might spoil the user's enjoyment of the program 114 (that is, if the user has also recorded this program 114 and intends to watch it in its entirety). Third, recording the program 102 such that it begins at the padded starting time 106 and ends at the padded ending time 108 is not efficient, as the DVR is consuming storage space to store superfluous content. For instance, for a 30 minute program, recording a five minute padding at the start of the program and at the end of the program increases the disk consumption for that recording by 33%.

For at least the above-identified exemplary reasons, there is a need for more efficient strategies for recording and playing back media information, as well as other kinds of information.

SUMMARY

Functionality is described herein which address the needs set forth above, as well as other needs.

According to one exemplary implementation, functionality is described for recording a program based on initial playback decisions. For example, the initial playback decisions may specify that the program is to be recorded starting at a padded starting time and terminating at a padded ending time. The functionality then monitors the manner in which a population of users actually consumes the program, to provide actual event data. The functionality forms modified playback decisions based on the actual event data. Then, based on the modified playback decisions, the functionality makes modifications that may affect the playback of the recorded program. For example, the functionality can adjust the bookmarking of the recorded program such that the program begins to play at the actual starting time of the program and stops playing at the actual ending time of the program. In addition, or alternatively, the functionality can truncate the recorded program such that it conforms to the actual starting time and actual ending time of the program. Generally, in this approach, the actual starting and ending times are defined based on the collective behavior of the population of users.

According to another exemplary implementation, the functionality can collect actual event data that describes other aspects of the users' behavior as they consume the program. For instance, the actual event data can identify the fact that a statistically significant sample of users skipped over one or more parts of the program (corresponding to, for example, one or more commercials).

The above strategies confer a number of benefits. According to one exemplary benefit, the functionality eliminates or reduces the need for the users to manually scan through an initial padded portion of a recorded program to find the true start of the program. The users can advance automatically (or semi-automatically) to the true starting point of the program. According to another exemplary benefit, the recorded program can be trimmed to coincide with its true starting time and ending time. This helps reduce the amount of unnecessary program content that is stored by the functionality.

Additional exemplary implementations and attendant benefits of the functionality are described in the following, including a manual mode of operation in which a user is allowed to manually advance to the actual starting time of a recorded program.

The subject matter set forth in this Summary section refers to exemplary manifestations of the invention, and hence does not limit the scope of the invention set forth in the Claims section. More specifically, the Claims section may set forth aspects of the invention which are broader in scope than the concepts described in this Summary section.

Figure 1:
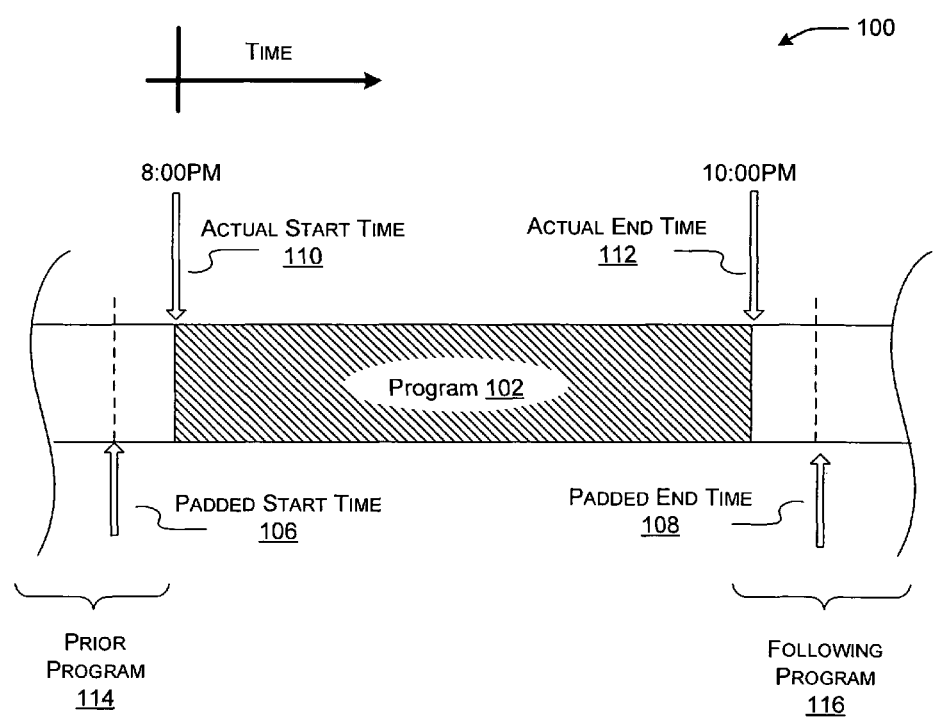
FIG. 1 shows an example of a known technique for padding the starting and ending times of a recorded program.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth strategies for recording information and controlling the playback of the information. In the context most often evoked in this discussion, the information corresponds to media information. The media information can include any information that conveys audio and/or video information, such as audio resources (e.g., music, spoken word subject matter, etc.), moving picture resources (e.g., audio-visual television programs, movies, etc.), computer programs (e.g., games, etc.), and so on. However, in a broader context, the information can correspond to any kind of data that can be consumed by a user in any fashion and in any environment.

This disclosure includes the following sections. Section A explains an exemplary system for governing the recording and playback of media information. Section B presents various flowcharts that describe the exemplary operation of the system of Section A.

A. Exemplary System (FIGS. 2-6)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of the System (FIG. 2)

Figure 2:
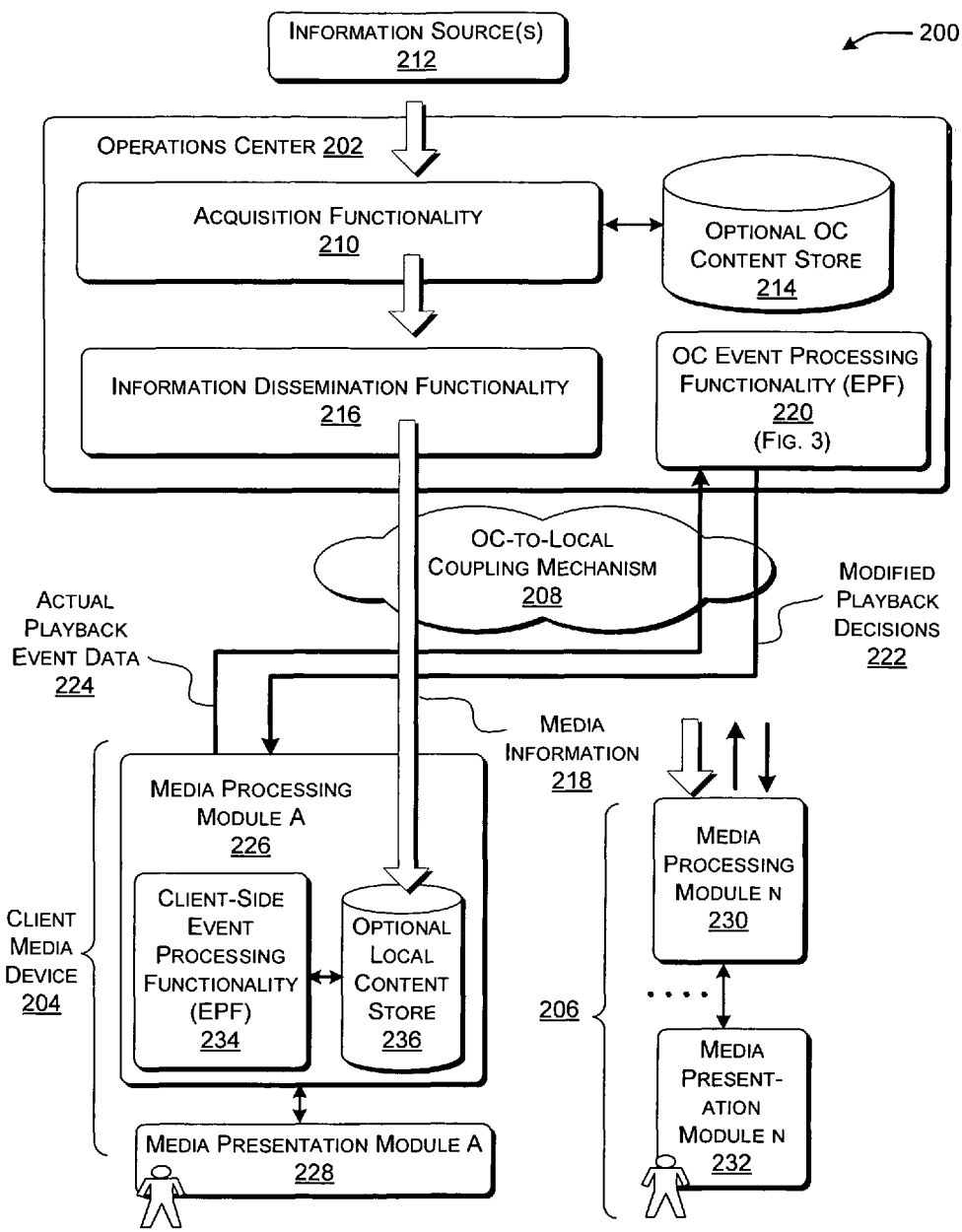
FIG. 2 shows an exemplary system for controlling the presentation of a recorded program based on modified playback decisions, which, in turn, are derived from actual event data that reflects the playback behavior of a population of users.

FIG. 2 shows one exemplary system 200 among many possible systems that can be used to record media information and govern the playback of the media information. By way of overview, the system 200 includes an operations center 202 for delivering streams of media information to a collection of client devices (204, ... 206) via a coupling mechanism 208. In general, the indicated allocation of processing functionality (to be described) between the operations center 202 and the client devices (204, ... 206) is merely exemplary; different implementations can vary the illustrated allocation of functionality in various ways.

The operations center 202 includes acquisition functionality 210 for supplying the media information from one or more sources 212 of such information. The sources 212 can represent any kind of entity which produces or provides media information, such as cable or satellite television providers, one or more Video-On-Demand (VOD) providers, one or more publishing houses of information, one or more library sources, any kind of Internet-enabled repository, and so on. The acquisition functionality 210 can comprise one or more server computers or other functionality dedicated to the task of retrieving the media information. The operations center 202 can optionally also include an information content store 214 for storing the media information prior to its dissemination to the client devices (204, ... 206). The information content store 214 can be implemented as one or more databases and associated database management functionality.

The system operations center 202 also can include information dissemination functionality 216 for supplying media information to the client devices (204, ... 206) via the coupling mechanism 208. This path is illustrated in FIG. 2 as path 218. Different systems may use the information dissemination functionality 218 in different ways. One exemplary system may use the information dissemination functionality 216 to transmit media information received from the acquisition functionality 210 in unicast fashion, multicast fashion, or a combination of unicast and multicast fashion. For example, co-pending and commonly assigned U.S. patent application Ser. No. 10/010,200, entitled, "ACCELERATED CHANNEL CHANGE IN RATE-LIMITED ENVIRONMENTS," naming the inventors of Geoffrey R. Smith et al., filed on Dec. 10, 2004, provides further exemplary details regarding one protocol for delivering resource information using a combination of unicast and multicast techniques. The information dissemination functionality 216 can be implemented as a collection of server modules (not shown) that facilitate the transmission of media information to the client devices (204, ... 206).

Whatever delivery strategy is used, the operations center 202 can deliver media information to the client devices (204, ... 208) using a variety of packaging paradigms. The media information can be expressed in any format, including, but not limited to, the MPEG-2 standard, Microsoft Corporation's VC-1 standard, the ISO/ITU H.264 standard, and so forth. The coded media information can be encapsulated into packets using any format, including, but not limited to, the Real Time Transport Protocol (RTP), the Real Time Streaming Protocol (RTSP), the Advanced Streaming Format (ASF), and so forth.

Finally, the operations center 202 also includes event processing functionality (EPF) 220. This functionality 220 is more specifically referred to as operations center (OC) event processing functionality (EPF) 220 to distinguish this functionality from counterpart functionality deployed at the local client sites. The purpose of the OC EPF 220 is to coordinate the recording and playback of programs. In the specific context of the present invention, the OC EPF 220 collects so-called actual event data which reflects the manner in which a pool of users have chosen to play back programs. The OC EPF 220 makes playback decisions based on this actual event data, and communicates such playback decisions to the client devices (204, . . . 206). The client devices (204, . . . 206) can use these playback decisions to govern the playback of recorded programs, such as by playing back the programs at starting and ending times that correspond to the actual starting and ending times of the programs. Additional information regarding the role of the OC EPF 220 is provided in the context of FIG. 3, to be discussed in turn.

The coupling mechanism 208 couples the operations center (OC) 202 to the client devices (204, . . . 206), and is therefore labeled in FIG. 2 as an OC-to-local coupling mechanism. This coupling mechanism 208 can be implemented in different ways to suit different technical and commercial environments. For instance, the coupling mechanism 208 can include any kind of network (or combination of networks), such as a wide area network (e.g., the Internet), an intranet, Digital Subscriber Line (DSL) network infrastructure, point-to-point coupling infrastructure, and so on. The coupling mechanism 208 can use or involve any kind of protocol or combination of protocols. In the case where one or more digital networks are used to disseminate information, the coupling mechanism 208 can include various hardwired and/or wireless links, routers, gateways, name servers, and so on. In the case where DSL infrastructure is used to disseminate information, the coupling mechanism 208 can utilize the services, in part, of telephone coupling infrastructure and DSL processing functionality.

The above-described architecture corresponds to a digital implementation of the invention, in which the operations center 202 forwards packetized media information to the users over a digital network. However, the principles described herein can be implemented in many other kinds of architectures. For instance, the principles can be implemented in a cable system architecture, in which the operations center 202 delivers media information (in analog and/or digital form) to cable set-top boxes via a cable routing infrastructure.

In any event, the architecture shown in FIG. 2 includes one or more downlink paths and one or more uplink paths. The downlink paths are used to forward media information to the client device (204, . . . 206). This is the use of path 218. In the context of the present invention, the downlink paths can also be used to forward modified playback decisions that are used by the client devices (204, . . . 206) to modify recorded programs. This is the use of path 222. The uplink paths can be used by the client devices (204, . . . 206) to forward various reporting data (such as actual event data) to the operations center 202. This is the use of path 224. The uplink and downlink paths can be implemented by the same communication mechanism, or by different respective communication mechanisms. For example, in one case, the operations center 202 can disseminate media information to the client devices (204, . . . 206) via a cable infrastructure, but rely on a telephone coupling path to transmit the actual event data from the client devices (204, . . . 206) to the operations center 202. Many other implementations are possible.

Now referring to the client-side aspects of the system 200, the client devices (204, . . . 206) can be implemented in different ways. A given client device (204, . . . 206) can represent a television set with integral IP interfacing/processing functionality, a television set with an associated set-top box coupled thereto, a digital video recorder (DVR) device, a rewritable digital video disc (DVD-RW) device, a personal computer having AV processing functionality, and so forth (as well as any combination of these devices). In whatever manner the client devices (204, . . . 206) are implemented, they can comprise a media processing module that is communicatively coupled to a media presentation module. For instance, the client device 204 includes media processing module 226 coupled to media presentation module 228, and the client device 206 includes media processing module 230 coupled to a media presentation module 232. The media processing modules (226, . . . 230) comprise functionality for processing the media information and performing other data processing functions, and the media presentation modules (228, . . . 232) comprise functionality for presenting the output of the media processing modules (226, . . . 230). The media processing modules (226 . . . 230) can be integrated with the media presentation modules (228, . . . 232), or the media processing modules (226, . . . 230) can be separate from (but coupled to) the media presentation modules (228, . . . 232).

FIG. 2 shows an overview of the exemplary composition of the representative client device 204. This device 204 includes the media processing module 226, which, in turn, can comprise client-side event processing functionality (EPF) 234. This functionality 234 performs whatever tasks are required to cooperate with the operations center 202 to record and play back media information according to the principles described herein. For example, the client-side EPF 234 can coordinate the user's selection of programs to be recorded, and the activation of previously recorded programs. The client-side EPF 234 can also coordinate the transmission of actual event data to the operations center via path 224; this data identifies the behavior of the user in consuming a program. The client-side EPF 234 can also govern the modification of stored programs in response to the modified playback decisions received via path 222.

In one implementation, the client device 204 records programs in a local content store 236. In another implementation, the operations center 202 can maintain a store (not shown in FIG. 2) for recording programs to be played back at the client devices (204, . . . 206).

As mentioned, the principles described herein can be implemented in many other kinds of architectures. In one alternative architecture, modified playback decisions can be formed in a distributed peer-to-peer (P2P) manner, that is, without the use of an operations center, or with at least reduced reliance on an operations center. In this case, client devices can directly transmit actual event data to peer client devices that reflect the users' behavior in consuming a program. The EPFs of the recipient client devices can each locally determine whether the actual event data exhibits statistically significant trends. If so, the EPFs of the client devices can generate modified playback decisions which will govern subsequent program playback. Any P2P routing paradigm can be used to distribute actual event data among the peers (e.g., CHORD, TAPESTRY, etc.).

Indeed, in a minimal case of local EPF implementation, a single client device can aggregate actual event data created by a user or users who watch a program using that client device. If a user or users consistently exhibit the same behavior while watching the program, then this pattern of behavior can be detected by the client device's local EPF and applied to subsequent viewings of the program. In this implementation, the client device need not transmit any actual event data to any other entity.

In another alternative architecture, multiple event processing functionalities (EPFs) can be used. These different EPFs can perform different tasks. For example, different EPFs can be used to process different kinds of programs. Or different EPFs can be used to process different kinds of events. These different EPFs can be administered by the same entity or possibly different respective entities. Moreover, EPFs can be administered by the same entity which delivers the media information, or by a different entity or entities. In any of these scenarios, users may be permitted to subscribe to one or more EPFs by paying a subscription fee. For example, a user can pay a monthly fee to receive an EPF that eliminates commercials in programs recorded on a given channel.

While various architectures can be used, to facilitate discussion, this disclosure will continue to feature the exemplary implementation shown in FIG. 2 in which a singular OC EPF 220 plays the primary role in forming modified playback decisions.

A.2. Exemplary Operating Center EPF (FIGS. 3 and 4)

Figure 3:
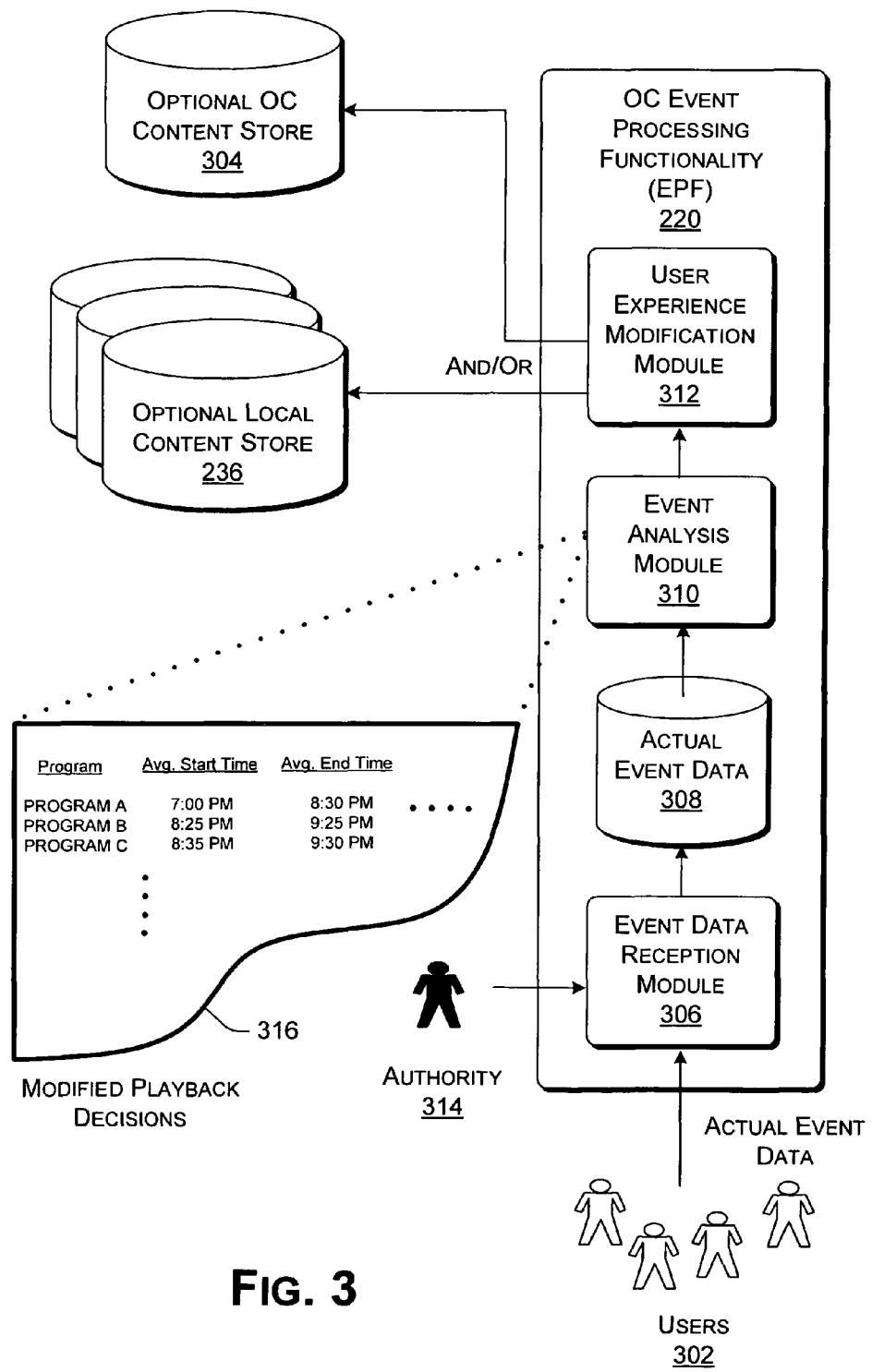
FIG. 3 shows exemplary event processing functionality (EPF) for use in the system of FIG. 2, for producing the modified playback decisions.
Figure 4:
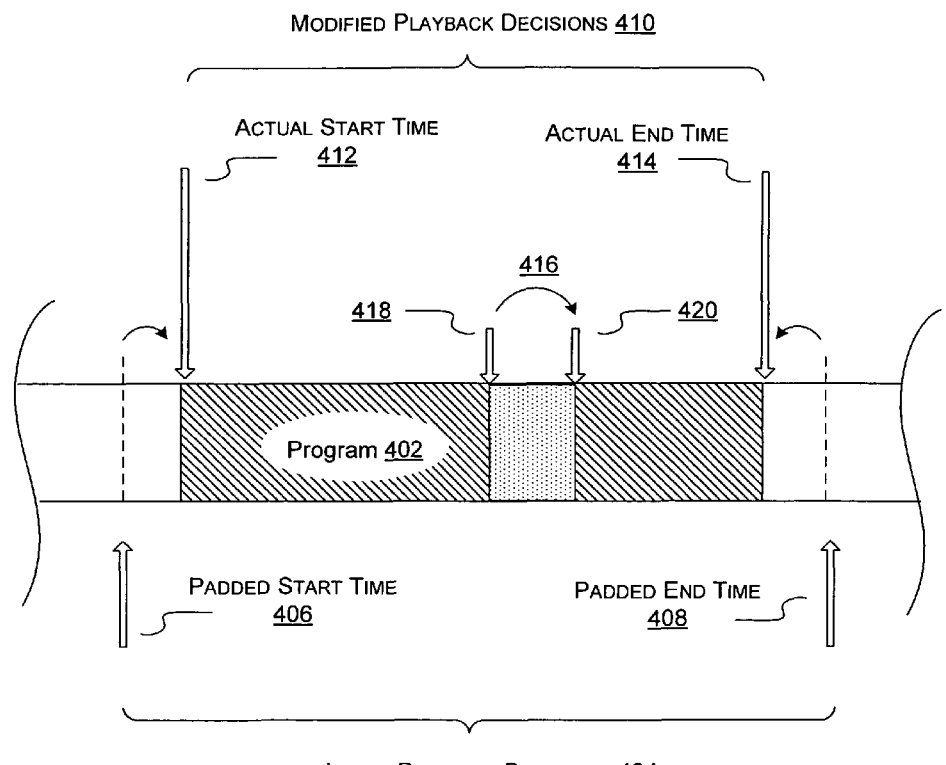
FIG. 4 shows one example of the application of the EPF functionality of FIG. 3.

FIG. 3 provides additional details regarding the operations center (OC) EPF 220 introduced in the context of FIG. 2. This functionality 220 can be implemented by one or more computer devices or other kind of processing functionality. One or more aspects of the OC EPF 220 can be alternatively allocated to the client-side EPF, e.g., client-side EPF 234.

To begin with, it is assumed that a pool of users 302 have recorded one or more programs to be consumed at times based on the individual respective preferences of the users 302. The system 200 (of FIG. 2) can store these programs at an operations center store 304 and/or at each of the client devices' (204, ... 206) respective local stores (e.g., at the store 236 of client device 204). The system 200 stores these programs in accordance with so-called initial playback decisions. The initial playback decisions specify a default manner in which the programs are to be presented by the client devices (204, . . . 206). For example, the initial playback decisions might specify that each program is to be recorded based on the starting and ending times specified in an EPG guide, as modified by a leading padded offset and a trailing padded offset. In one example, this offset can comprise a five minute interval added to the beginning and end of the programs.

By way of overview, the basic purpose of the OC EPF 220 is to collect actual event data from the pool of users 302, and to use this data to make modifications which potentially affect the playback of the programs stored in the stores (304, 236). In other words, the OC EPF 220 receives event data from the pool of users 302, forms modified playback decisions based on this data, and uses the modified playback decisions to modify the initial playback decisions. Consider the following example. Based on received actual event data, the OC EPF 220 may determine that a statistically significant number of the users 302 actually started a program at the EPG-specified starting time, rather than the padded started time. The OC EPF 220 can marshal this event data to form modified playback decisions for this program. Namely, the modified playback decisions may specify, among other instructions, that the program should start at the EPG-specified starting time, rather than the padded starting time specified by the initial playback decisions. The OC EPF 220 can make modifications which will potentially affect the playback of the program stored in the stores (304, 236) based on the modified playback decisions, such as by bookmarking the program in accordance with the modified playback decisions, truncating the program in accordance with the modified playback decisions, and so forth. In general, some of these modifications affect the manner in which the program is played back without changing the actual content of the program itself. Other modifications may affect the recorded program content, such as by erasing part of the program.

When a user subsequently activates the program to consume it, the program can be played back in accordance with the modified playback decisions, eliminating the need for the user to manually find the starting point of the program. That is, in this approach, users who view the recorded program can effectively draw on the collective decision-making of a large number of users 302. This strategy also potentially reduces the amount of storage required to record the program by eliminating superfluous padding content (if this is appropriate).

Each of the components of the OC EPF 220 that enable the above-described manner of operation will be described in turn. In general, the OC EPF 220 itself includes an event data reception module 306, an event data store 308, an event analysis module 310, and a playback experience modification module 312.

To begin with, the event data reception module 308 collects so-called actual event data from a pool of users 310. The actual event data reflects the behavior of the users 302 when consuming programs. Exemplary behavior of these users can encompass a wide variety of actions, including, by not limited to the following actions:

Actual event data may reflect the users' actions in advancing from a padded starting time (specified by the initial playback decisions) to an actual starting time. For example, assume that a user activates a program and notices that the end portion of a preceding program is being played. The user can advance to the actual starting time of the desired program by activating any type of program advancement command, such as a fast forward command, a skip command, and so forth.

Actual event data may reflect the users' actions in ending their consumption of a program before the padded ending time (specified by the initial playback decisions). For example, assume that a user notices that the recorded program content runs beyond the end of the desired program. The user can terminate the recorded program by activating a stop command or a like command.

Actual event data may reflect the users' actions in skipping portions of the program. For example, assume that the program contains one or more commercials that the user does not wish to watch. The user can skip these commercials by activating any type of program advancement command, such as a fast forward command, a skip command, and so forth.

Actual event data may reflect the users' actions in performing any other program playback commands that deviate from the normal (1×) playback of the program. For instance, assume that a program contains a particularly interesting portion. The user might respond by activating a pause command or a slow-motion advancement command. Or perhaps the user might decide to "rewind" (move back) and watch an interesting portion of the program again. Alternatively, assume that a program contains a portion that does not interest the user. The user might respond by activating a fast forward command to quickly advance through this portion. These scenarios are merely illustrative; the user can activate a great variety of commands which temporally affect the playback of the program, deviating from the normal 1× playback of the program.

Actual event data may reflect the users' actions that affect some non-temporal aspect of the playback of the program. For example, the user may decide to adjust the video component and/or the audio component of the program for any reason. The user may also activate close-captioning, high-definition mode, and so forth. These are merely illustrative examples of the manner in which the user can manipulate the program upon playback (without necessarily affecting the temporal aspects of the program's playback).

Actual event data may reflect the users' actions that affect the manner in which the program is archived. For example, the user may consider a portion of a sports program as particularly noteworthy, and, in response, decide to more permanently archive this portion so that it can be repeatedly viewed without risk of erasure.

Actual event data may reflect the timing at which users play back a recorded program. This might prove useful in various circumstances. For instance, suppose that a statistically significant number of users record a program on Saturday night, but actually watch the program on Monday night. Once this trend is detected on Monday night, modified playback decisions can be formulated to increase the "visibility" of this program within a user interface presentation used to select recorded programs. This provision potentially makes it easier for other users (who have not yet watched the program) to also select the program on Monday night.

Users can produce still other kinds of actual event data.

Moreover, as used herein, the term "program" should be liberally construed. In one case, a program refers to a unique piece of media content. In another case, a "program" may generally refer to a group of programs that bear some relationship, such as a series that includes multiple episodes. For example, assume that the program corresponds to a late night talk show, which reliably starts at 11:35 PM each day of the work week, although the EPG data states that this show begins at 11:30 PM. In this context, the users' behavior in watching this program, regardless of the specific content of the episodes, can be mined to extract meaningful trends, which can then be applied to improve user experience for future episode recordings of this program, regardless of the specific content of the future episodes.

Indeed, certain trends may even appear regardless of the programs that the users are watching. For example, users that watch programs late at night might decrease the volume so as to not disturb others in the household. Actual event data can be collected which reflects these kinds of program-independent trends. These trends can then be applied to formulate modified playback decisions that apply to program consumption late at night, independent of the programs being watched.

In any case, the event data reception module 308 can receive actual event data from the client devices (204, ... 206) via any channel or mechanism, such as via exemplary path 224 shown in FIG. 2. The client device (204, ... 206) can send event data to the event data reception module 308 on their own initiative in response to the occurrence of events during playback. Or the event data reception module 308 can periodically poll the client devices (204, ... 206) to collect any new actual event data.

The event data reception module 306 can also receive actual event data from one or more so-called authorities 314. An authority may represent an individual who is entrusted to review a recorded program and to make various playback actions that govern the playback of the program for others. For example, this user may be entrusted to identify the starting and ending times of the program, to mark the locations of commercials, and so forth. The entity that administers the OC EPF can "hire" such an individual. Alternatively, one or more users in the general pool of users 302 may volunteer to serve the role of authoritative consumers of the program. Actual event data received from the authority 314, even though not endorsed by the behavior of a large number of users, may be heavily weighted by the OC processing functionality 220, because, by definition, the authority 314 is authorized to make qualified decisions regarding the manner in which the program should be played back.

In any case, the event data reception module 306 can store the actual event data in an event data store 308. This event data can be expressed in any manner, such as by bookmark data. The bookmark data identifies the temporal locations in the program at which events occur, and also identifies what is to happen at these locations.

The event module 310 retrieves the actual event data from the event data store 308 and performs analysis on this data. The basic role of the event analysis module 310 is to identify trends in the actual event data. That is, the event analysis module 310 attempts to determine whether a statistically significant number of users performed the same action at the same juncture in the playback of a program. If so, the event analysis module 310 makes the determination that this event is a significant event that should be potentially applied in automatic fashion or semi-automatic fashion to the recorded program, thus eliminating the need for future viewers to manually duplicate the actions made by the pool of prior users 302.

The event analysis module 310 can identify statistically significant events in different ways depending on different environments and other considerations. In one case, the event analysis module 310 can apply thresholding rules to determine when an event is statistically significant. For example, the event analysis module 310 can determine that a program actually starts later than a padded starting time by observing that more than a prescribed number of users have activated the fast forward command immediately after the program begins to play, or by observing that more than a prescribed percentage of the users who have recorded the program have made such an action, and so on. The event analysis module 310 can define the actual starting time in these circumstances by averaging the times at which the respective users began playing the program at a normal 1× playback mode. In another implementation, the event analysis module 310 can apply more advanced tools to determine the presence of statistically significant trends, such as by using clustering analysis, and so forth. The event analysis module 310 can also apply additional weight to any actual event data collected form authority sources 314, e.g., without requiring that such data meet prescribed significance-related thresholds, or by requiring that such data meet more relaxed significance-related thresholds.

The event analysis module 310 can formulate its conclusions regarding statistically significant events as so-called modified playback decisions. These decisions are "modified" in the sense that they may potentially be used to modify the initial playback decisions that were used to record the program. The event analysis module 310 can register these modified playback decisions in various ways. In one such technique, the event analysis module 310 can store the modified playback decisions in a table 316. In this example, the table 316 identifies actual starting times and actual ending times for a collection of programs, produced by averaging the starting times and ending times identified by the pool of users 302. Although not shown, this table 316 can store any other statistically significant event that has occurred during the playback of the program, such as the skipping of commercials, the activation of various so-called trick play modes, the activation of close-captioning, and so on.

In one exemplary variation, the event analysis module 310 can apply different rules, considerations, and interpretations to different types of programs. For instance, the event analysis module 310 can be configured such that different rules apply to actual event data collected during a sports program compared to actual event data collected during a movie, and so forth.

The playback experience modification module 312 uses the modified playback decisions to make modifications which potentially affect the playback of the programs that were stored in the OC content store 304 and/or the local content stores (e.g., local content store 236 of client device 204). As described above, modification can take various forms, such as by altering the bookmarking of the programs (which may or may not affect the content of the recorded programs), truncating the programs (by deleted certain superfluous portions from the programs), and so forth. In one case, the playback experience modification module 312 can automatically perform these modifications. In another case, the playback experience modification module 312 can give future consumers of the programs the option of invoking the modified playback decisions, such that these decisions are not automatically applied.

More specifically, in one implementation, the playback experience modification module 312 can make the modifications by actually executing the instructions associated with the modified playback decisions, sending instructions that may affect the OC content store 304 and/or the local content stores of the clients (204, . . . 206). In another scenario, the playback experience modification module 312 can make the modifications by forwarding the modified playback decisions to the client devices (204, . . . 206), upon which the client devices (204, . . . 206) execute the instructions associated with the modified playback decisions (possibly in an "offline" manner after receipt). In other words, in this latter case, the playback experience modification module 312 acts principally as a conduit for the decisions, not the actual executor of the decisions. As a definitional matter, any information transmitted by the operations center 202 to the client devices (204, . . . 206) is referred to as "modified playback decisions," whether such information pertains to the yet-to-be executed decisions, or instructions generated in response to the execution of those decisions. In another implementation, the entire playback experience modification module 312, or parts thereof, can be implemented on a local level by the client devices (204, . . . 206).

As a general observation, the modified playback decisions may become more reliable and/or more numerous as the data set of actual event data becomes more robust. The data set becomes more robust, in turn, as more users actually view the program (to generate actual event data in the course of their consumption of the program). This also implies that the modified playback decision may not be available or may not be suitably reliable for a certain number of users who are first to play back a program (unless, perhaps, an authoritative source 314 has previously viewed the program).

The analyses described in FIG. 3 can be applied in a number of different contexts. In the most common scenario described here, a collection of users enter instructions to record a program, and after recording, the users actually watch the program at uncorrelated times determined by the users' respective preferences.

In another scenario, many of the users can watch a program essentially in real time and at the same time. In other words, the playback in this case is synchronized among users. Even in this case, the actions of many users acting in unison can be detected and then marshaled so that these actions can be applied for the benefit of other real time users who have not yet taken these actions. For example, assume that 50,000 users are all watching a live broadcast of a sporting event. If at the commencement of a commercial, the OC EPF 220 detects that 10,000 of these users have decreased the volume, the OC EPF might automatically decrease the volume at the client devices for the remaining 40,000 real time users. There is understandably a time lag before such an automatic control can take effect, as the OC EPF 220 needs some time to collect actual event data and to determine whether a statistically significant trend is present. The modifications made by the real time users can also be marshaled to benefit other users who watch the program at any time which is delayed from its real time airing. Even a short time offset from real time viewing (e.g., five minutes or possibly shorter) may allow the non-real time users to reap the benefits of the knowledge that the OF EPF 220 gleans from the real time users, the real time users acting as vanguard authorities for the program.

Different provisions can be applied to remove or relax modified playback decisions defined by the event analysis module 310. For instance, assume that the event analysis module 310 determines, through the collective playback behavior of users, that a program series begins at 8:35 PM every Tuesday. In the manner described above, the event analysis module 310 can formulate modified playback decisions that provide instructions to begin the playback at 8:35 PM. However, assume that the network provider makes schedule changes such that the program now begins at 8:20 PM. Alternatively, or in addition, the provider may change the length of the program, and so on. In one case, the event analysis module 310 can rely on the collective behavior of users to gradually define updated modified playback decisions. In another case, under certain conditions, the event analysis module 310 can reset the modified playback decisions to a default state. The default state may correspond to a state defined by the initial playback decisions, or new EPG data (if appropriate), and so on. For example, the event analysis module 310 can invoke a reset operation when it detects that users are making relatively large changes during program playback, or when the EPG data itself changes, and so on. This reset action may help the event analysis module 310 to more quickly converge on the desired playback conditions. In another implementation, the user may be permitted to expressly override the application of modified playback decisions.

Still other usage scenarios are possible.

Instead of, or in addition to, the automatic analyses performed by the OC EPF 220 shown in FIG. 3, the system 200 can support a manual mode of producing certain playback decisions. For instance, in one case, the OC EPF 220 can record a program such that it includes a padded start time $T_s-T_p$, where $T_s$ corresponds to the EPG-scheduled start time, and $T_p$ corresponds to a padded offset time. The padded start time $T_s-T_p$ accounts for the possibility that the desired program may start earlier than its scheduled time $T_s$ as specified by the EPG. But instead of starting the playback at the padded starting time $T_s-T_p$, the OC EPF 220 can start the program at the scheduled starting time $T_s$. This approach still gives the user the option of seeking out an earlier starting time if the scheduled starting time $T_s$ does not coincide with the actual starting time. This operation is referred to as the manual mode of operation, since the user is required, if necessary, to manually activate a "rewind" command to reach the actual start of the program.

FIG. 4 provides one illustration of the above-described principles, as applied to an exemplary recorded program 402.

First, the system 200 of FIG. 2 records the program 402 based on a set of initial recording decisions 404. The initial decisions 404 may include a decision to start recording at a padded starting time 406 and to stop recording at a padded ending time 408. These specific initial playback decisions 402 are merely exemplary.

The OC EPF 220 formulates modified playback decisions 410 based on its analysis of actual event data collected from the pool of users 302. In this entirely exemplary case, the modified playback decisions 410 include a decision to begin playing back the program 402 at an actual starting time 412 (which temporally follows the padded starting time 406), and to stop playing the program 402 at an actual ending time 414 (which temporally precedes the padded ending time 408). The modified playback decisions 410 also include the decision to skip a portion 416 of the program 402 bounded by a segment starting point 418 and a segment ending point 420. This portion 416, for instance, may correspond to a commercial.

In one case, the OC EPF 220 can implement the modified playback decisions 410 by storing bookmarks which identify various events which are to occur in the playback of the program 402 (e.g., by storing the time at which these events are to occur, and a description of what actions these events entail). The modifications do not necessarily change the content of the program 402 itself. Alternatively, or in addition, the OC EPF 220 can actually truncate (e.g., erase) parts of the program which will not be presented to the users, such as the portion between the padded starting time 406 and the actual starting time 412, the portion between the actual ending time 414 and the padded ending time 408, and the portion 416 demarcated by the segment starting point 418 and the segment ending point 420. Other changes (not shown) that can be made do not affect the temporal manner in which the program 402 is played back; these changes can be made by adding various kinds of attributes to different parts of the program 402. For example, a certain juncture of the program 402 can be marked with close-captioning indicia, to indicate that close-captioning should be applied to the playback at this point in time.

FIG. 4 also serves as a vehicle for illustrating the operation of the manual mode for determining the starting time of the program 402. In this mode, the OC EPF 220 bookmarks the EPG-scheduled starting time 412 ($T_s$) as the point in time at which to commence presenting the program 402 when the user activates the program. In this specific example, the scheduled time $T_s$ does in fact correspond to the actual starting time (412) of the program 402. But even if it did not, the system 200 has recorded the program beginning from the padded start time 406, i.e., $T_s-T_p$, giving the user the option of manually seeking out an earlier starting time within this interval.

Moreover, this manual mode can be combined with the above-described provisions for automatically (or semi-automatically) modifying the playback experience. For example, if the EPF 220 detects that many people are rewinding a program upon its commencement, then the EPF 220 can formulate modified playback decisions which adjust the start of the program to a juncture which more likely reflects the actual start of the program.

A.3. Exemplary Client-End Details (FIG. 5)

Figure 5:
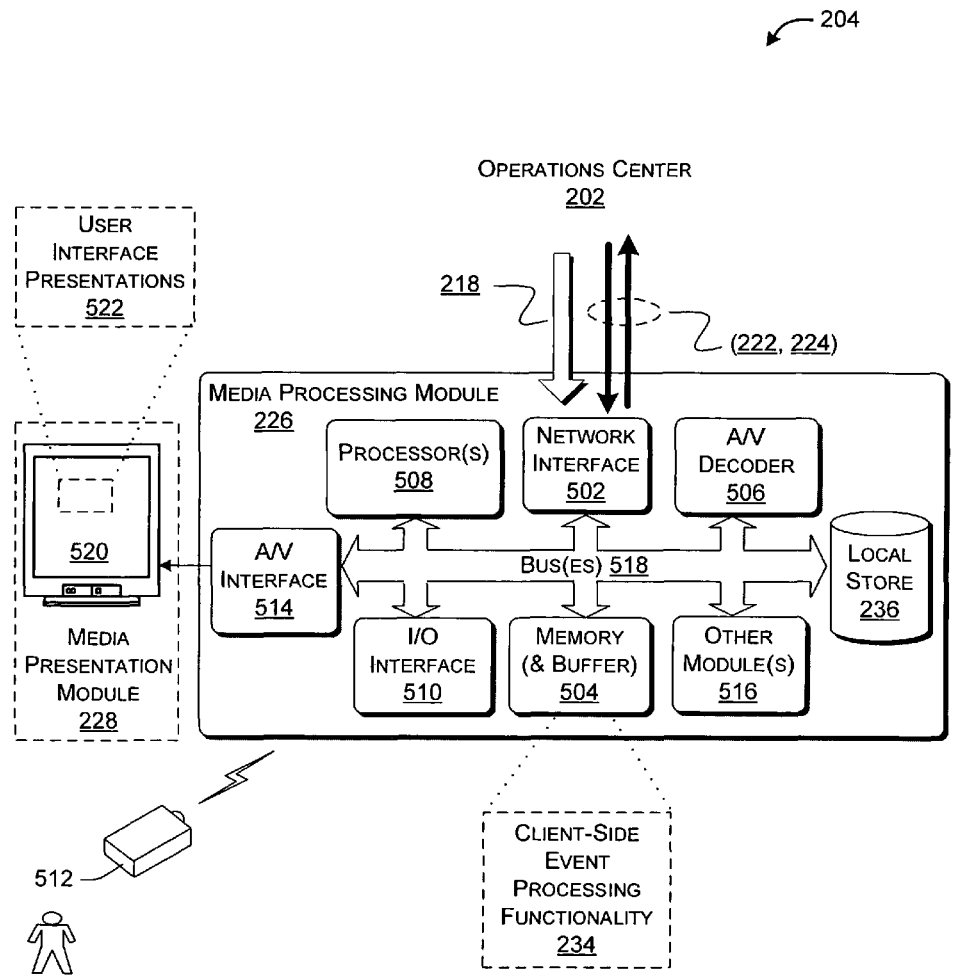
FIG. 5 shows exemplary details of client-side functionality for use in the system of FIG. 2.

FIG. 5 provides additional details regarding the representative client device 204 (introduced in the context of FIG. 2). The client device 204 itself comprises the above-identified media processing module 226 coupled to the media presentation module 228. In one case, the media processing module 226 can comprise AV processing functionality combined with the media presentation module 228 in a single integrated device (e.g., in a single IP-ready television set). In another case, the media processing module 226 can comprise a separate set-top box, DVR unit, or other kind of separate unit that communicatively couples to the media presentation module 228 (e.g., a television screen) via cable coupling or the like.

The media processing module 226 can include a number of modules for performing its ascribed tasks. To begin with, the media processing module 226 includes a network interface module 502. The network interface module 502 can represent any functionality for receiving media information from the operations center 202 using any coupling mechanism. For example, the network interface module 502 can comprise an Ethernet NIC, a DSL modem, a cable modem, a wireless network interface, or other kind of network interface equipment. The media processing module 226 also includes memory 504. A portion of the memory 504 can comprise program instructions for implementing the client-side EPF 234. The media processing module also includes an audiovisual (AV) decoder 506 for decoding (and decompressing) the received media information into its video and audio components. Decoding comprises ordering packets (if received out of order), extracting media information from the stream of received packets, and also extracting timing information that will govern the playback of the media information. The media processing module 226 also includes one or more processors 508 for executing instructions to implement the functionality of the media processing module 226. The media processing module 226 also includes an I/O interface 510 for interacting with the user via one or more input devices, such as a remote controller 512, a personal computer (not shown), a joy stick (not shown), a voice recognition mechanism (not shown), and so forth. The media processing module 226 also includes an A/V interface module 514 for providing media information in an appropriate format to the media presentation module 228. The media processing module 226 also includes the above-identified local store 236 for storing recorded programs, event data, and other data. Finally, the client processing module 226 can include various other modules 516, not specifically identified by name in the figure. For instance, the client processing module 226 can include a graphics compositor for combining a video component of the media information from the AV decoder 506 on a frame-by-frame basis with graphics information. The graphics information may comprise various user interface presentations which are overlaid on the media information. One or more busses 518 communicatively couple the above-identified components together.

The media presentation module 228 can comprise any kind of device for presenting AV information, including a CRT-type device, an LCD-type device, and so forth. In any case, the media presentation device 228 defines a display surface 520. The media processing module 226 can present one or more user interface presentations 524 on the display surface 520.

Figure 6:
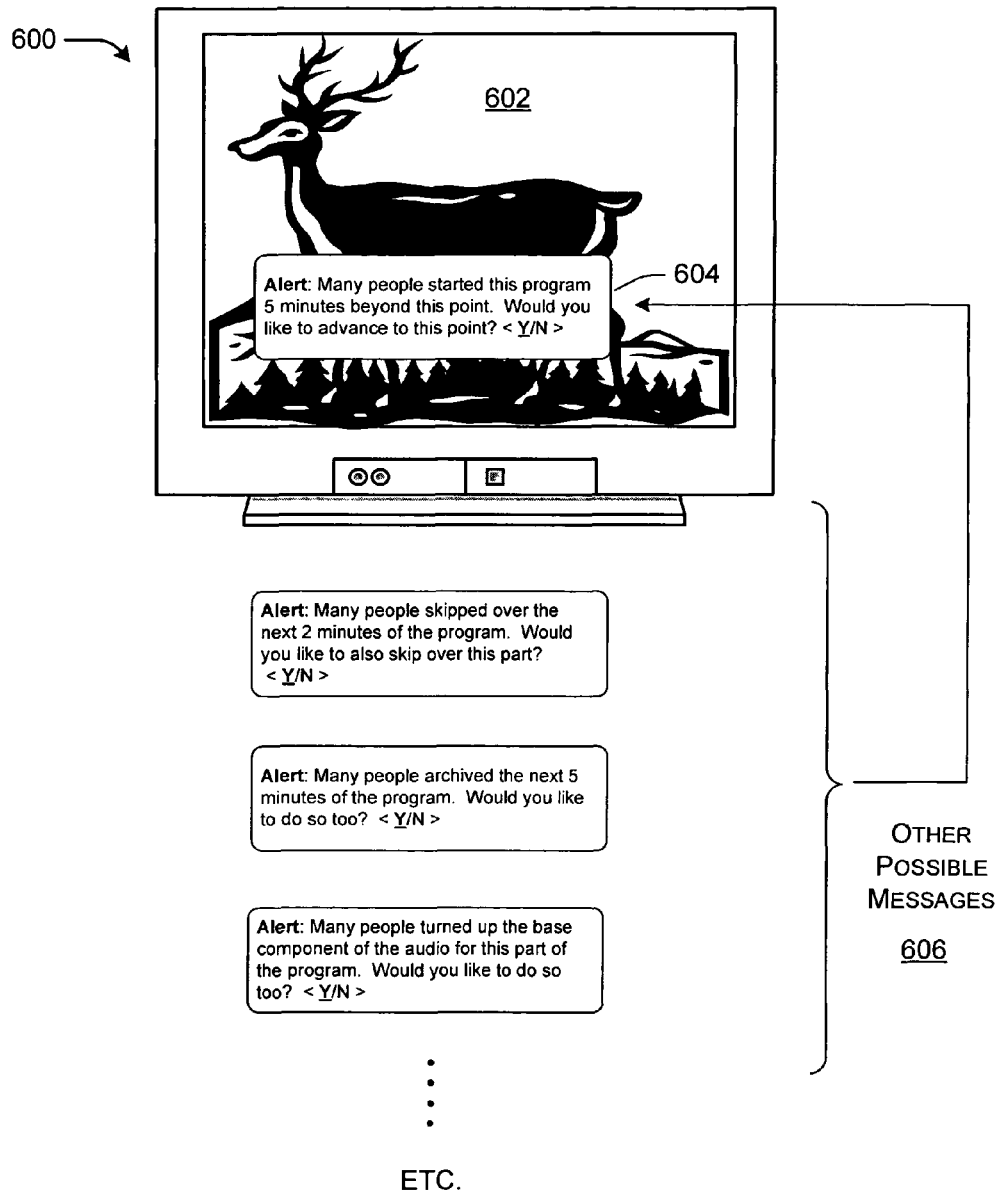
FIG. 6 shows an exemplary user interface presentation that allows a user to invoke modified playback decisions produced by the EPF of FIG. 3.

A.4. Exemplary User Interface Presentations (FIG. 6)

As described above, in one implementation the playback experience modification module 312 of FIG. 3 can automatically invoke the modified playback decisions. For example, in this scenario, if the OC EPF 220 determines that the actual starting time of a program should be different than the initially recorded starting time, then the playback experience modification module 312 can automatically adjust the program starting time, e.g., by changing the bookmarking applied to the recorded program (such that when the user activates the program, it starts at the bookmarked starting time), or by actually truncated the superfluous portion at the start of the recorded program.

But in another scenario, the playback experience modification module 312 can prompt the user through various means to determine whether the user wishes to invoke the modified playback decisions. This might be appropriate in many instances, as each individual user may have a different preference as to whether the modified decisions should be invoked. Such a prompt can take any form, such as a graphical user interface message, an audible message, and so forth (or some combination of forms).

In general, the playback experience modification module 312 can prompt the users at various appropriate junctures during the playback of the recorded program, such as when the program is initially activated, or at a juncture in the program's playback when the particular change being proposed should be applied. For example, suppose that many people have opted to watch a particular sporting event in high-definition mode. After this trend has been confirmed by the OC EPF 202, the playback experience modification module 312 can ask each subsequent viewer whether he or she would like to invoke the high-definition mode immediately after this viewer activates the program. In a second scenario, suppose that many people have opted to skip a particular commercial. After this trend has been confirmed, the playback experience modification module 312 can ask each subsequent viewer whether he or she also wishes to skip the commercial; the playback experience modification module 312 can specifically present such a prompt immediately before the commercial airs or immediately after the commercial begins to air, and so forth. In general, reference to a "subsequent viewer" may describe a user who has entered instructions to record the program, but has not yet watched the program. But the term "subsequent viewer" can also apply to a user who has watched a recorded program in the past, and wishes to watch the same program again (at which time the modified playback decisions may now be in effect).

FIG. 6 shows one exemplary way that the playback experience modification module 312 can issue prompts to the user. The presentation 600 shown there includes a main display portion 602 that presents the principal media information that the user is consuming at the time that the prompting message is displayed. Consider the case in which the user intends to watch a courtroom drama. But when the user activates this program, he or she is presented with the trailing end of a nature-related program. In this case, the playback experience modification module 312 can present a message 604 to the user to ask the user whether they would like to skip forward to the true start of the courtroom drama program, as assessed by the prior collective behavior of the users 302. The user can respond to the message 604 through various input devices, such as by selecting a Yes (Y) or No (N) option via the remote control device 512, via voice recognition functionality, and so forth.

FIG. 6 also shows a small sampling of other possible messages 606 that can be displayed at appropriate junctures in the playback of the program.

B. Exemplary Method of Operation (FIGS. 7-9)

Figure 7:
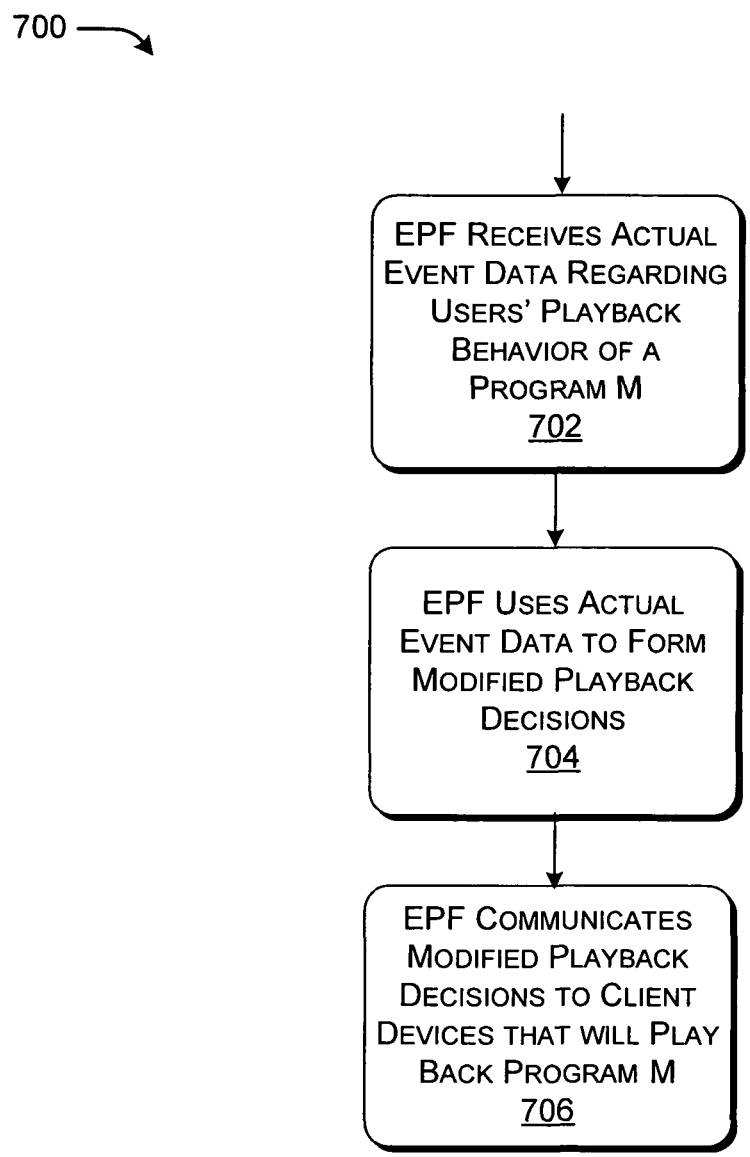
FIG. 7 shows an exemplary procedure for forming the modified playback decisions.
Figure 8:
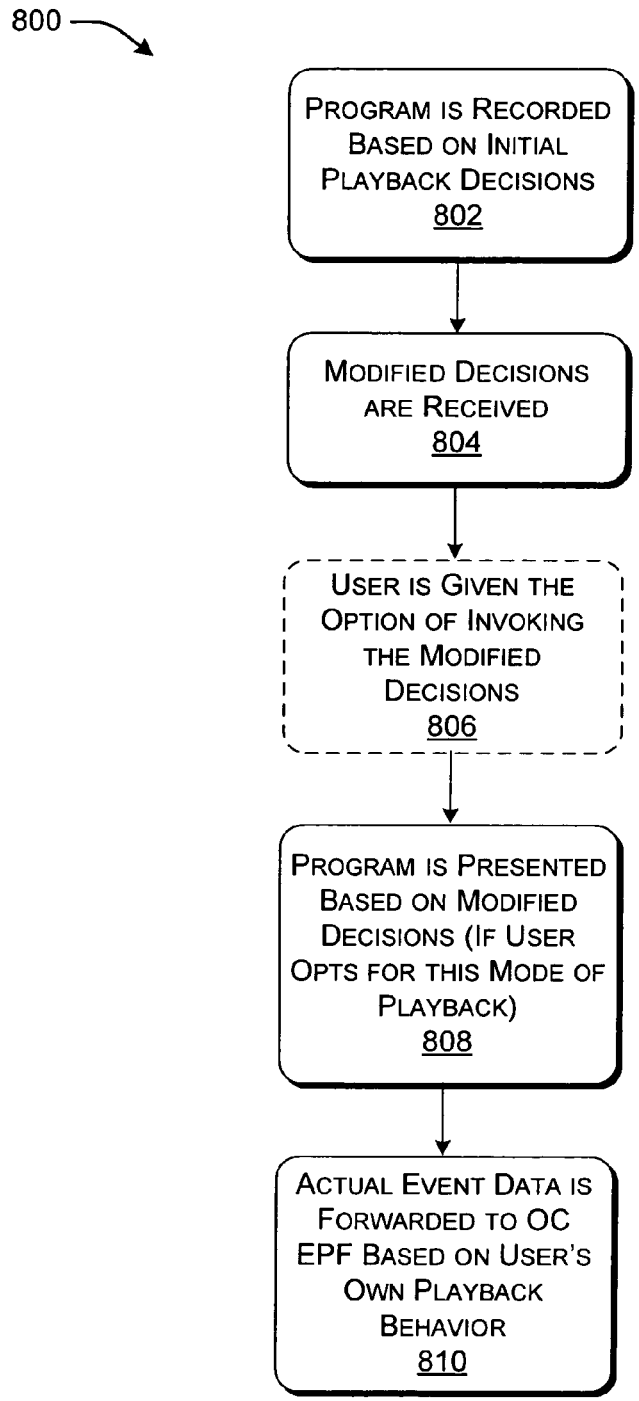
FIG. 8 shows an exemplary procedure for processing, at the client device, the modified playback decisions produced according to the procedure of FIG. 7.
Figure 9:
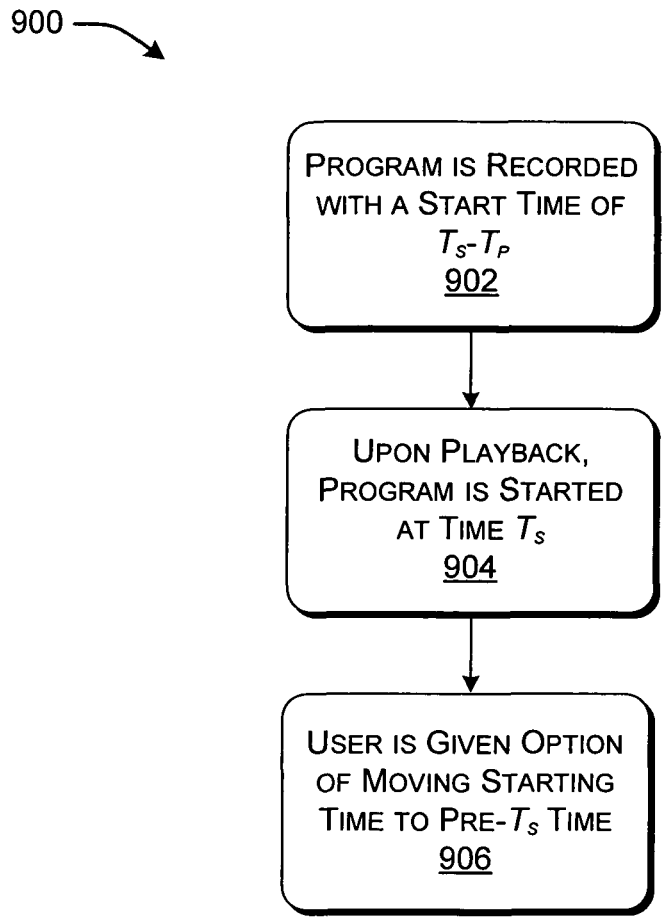
FIG. 9 shows an exemplary procedure for manually advancing to an actual starting time of a recorded program.

FIGS. 7-9 describe the operation of the system 200 in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in prior sections, Section B will serve primarily as a review of those functions.

B.1. Exemplary Processing Performed by the OC EPF (FIG. 7)

FIG. 7 shows a procedure 700 performed by the operations center (OC) event processing functionality (EPF) 220. However, one or more of these operations can alternatively, or in addition, by performed on a local level by the client devices (204, . . . 206).

In step 702, the OC EPF 220 receives actual event data regarding the pool of users' behavior while they consume a program under consideration. Such behavior may pertain to the users' actions at the start of the program, at the end of the program, or anywhere else in the program. The actions may pertain to temporal deviations from the normal (1×) mode of playback. Or the actions may pertain to some other operations which affect the program in some other non-temporal way.

In step 704, the OC EPF 220 uses the actual event data to form modified playback decisions. This step basically comprises identifying statistically significant trends in the users' actions, and formulating these trends into distinct playback decisions. For example, if the OC EPF 220 determines that a statistically significant number of people have skipped the first 3 minutes of a program upon playback, then the OC EPF 220 can formulate a playback decision which modifies the starting time to correspond to the actual starting time of the program (as determined by the point in time at which most users began watching the program in normal 1× mode).

In step 706, the OC EPF 220 can communicate its modified playback decisions to the client devices (204, . . . 206) and/or to appropriate components within the operations center 202. As will be described with reference to FIG. 8, these decisions can be used to make modifications that affect the playback of the recorded programs at the client devices (204, . . . 206). More specifically, in one case, in step 706, the playback experience modification module 312 executes the modified playback decisions received from the event analysis module 308, sending instructions to the client devices (204, . . . 206) and/or appropriate components of the operations center 202. In another case, in step 706, the playback experience module 312 sends the modified playback decisions to the client devices (204, . . . 206), after which these devices execute the decisions (possibly in "offline" fashion). To repeat, as a definitional matter, any information transmitted by the operations center 202 to the client devices (204, . . . 206) is referred to as "modified playback decisions," whether such information pertains to the yet-to-be executed decisions, or instructions generated in response to the execution of those decisions.

Certain operations identified in FIG. 7 can be performed on a local level within a local environment. For instance, the analysis shown in FIG. 7 can be performed within a single household that includes one or media devices. In this case, the procedure 700 can detect significant viewing trends for a recorded program within a single family, formulate decisions based on these trends, and then apply these decisions to the program, such that these decisions can automatically or semi-automatically be applied to subsequent viewings of the program within the family. In this case, the OC event processing functionality can be implemented by a computer within the household.

Moreover, as described above, in a P2P implementation, actual event data can be propagated among peer client devices without the assistance of the operations center 202, or with reduced reliance on the operations center 202.

B.2. Exemplary Processing Performed at a Client Device (FIG. 8)

FIG. 8 shows a procedure 800 that describes the operation of the system 200 from the user's standpoint, or, in other words, from standpoint of a client device (204, . . . 206).

In step 802, a user makes a decision to record a program through conventional DVR techniques, e.g., by identifying a listing of the program in an EPG-like presentation, and issuing instructions to record this program. The system 200 shown in FIG. 2 can record this program either at the local site (e.g., within the media device 204's local content store 236, or at the operations center 202 (e.g., within the OC content store 304 of FIG. 3).

It is assumed that many other people may have made a similar request to record this program. Further, in one mode of operation, these other users may begin watching the recorded program at different respective (uncorrelated) times depending on their respective preferences. These viewing events may cause the generation of actual event data that describes the users' viewing behavior. As described with reference to FIG. 7, receipt of this actual event data prompts the OC EPF 220 to generate modified playback decisions, which capture statistically significant trends in viewing behavior.

In step 804, the client device 204 optionally receives the modified playback decisions generated by the OC EPF 220, which reflect either instructions produced by the operations center 202's execution of the decisions, or yet-to-be executed decisions. This step is optional because, in the scenario in which the operations center 202 stores the program, the client devices (204, . . . 206) do not need to make local modifications, but, instead, are the beneficiaries of modifications made entirely at the operations center level.

In step 806, the user of the client device 204 is given the option of invoking the modified playback decisions, e.g., via the kind of user interface messages shown in FIG. 6, via voice message prompts, or through some other mechanism.

In step 808, the program is presented in accordance with the modified playback decisions (if these decisions have been invoked in step 806). This playback may comprise beginning the program at an altered started point, ending the program at an altered ending point, skipping over commercials, and so forth.

Finally, step 810 indicates that the playback of the program at the client device 204 may generate its own actual event data. For example, the user of the client device 204 may perform his or her own control actions which alter the playback of the program. The client device 204 can forward such actual event data to the OC EPF 220 for use in further refining the modified playback decisions. In this manner, the playback decisions can become more refined over time.

Consider a specific example. Initially, the modified playback decisions may indicate that a large population of users 302 have skipped the opening credits of a movie by using a fast forward command, and thus that this portion of a movie should be henceforth skipped for subsequent viewings of the movie. However, it may be the case that the subsequent users actually prefer to watch the opening credits in fast forward mode, rather than entirely skip these credits. The users' dissatisfaction with the modified playback decisions would be registered through their use of the "rewind" command to move back from the modified starting point. If this trend is exhibited by a sizable number of users, then the OC EPF 220 can revisit its playback decisions and possibly issue revised decisions to return the bookmarked starting point to the actual start of the movie.

Still other usage scenarios are possible.

In summary, the procedures 700 and 800 describe a consensus-like decision-making mechanism, which readily evolves to suit the expressed interests of users, but does not necessarily impose group decisions on the users who might prefer to maintain idiosyncratic viewing habits.

B.3. Exemplary Manual Mode of Operation (FIG. 9)

FIG. 9 shows a procedure 900 that describes a manual mode of operation of the system 200, in which the user manually advances to a desired starting point of a program.

In step 902, the system 200 records the program based on initial playback decisions. The initial playback decisions specify a padded starting time $T_s-T_p$, where $T_s$ is the scheduled starting time (e.g., as derived from EPG-data), and $T_p$ is the padded offset time interval.

In step 904, the user activates the program, upon which the program is started at time $T_s$ rather than the padded starting time $T_s-T_p$. The time $T_s$ may or may not correspond to the actual starting time of the program.

In step 906, assume that the time $T_s$ does not correspond to the actual starting time of the program. In this step, the user is given the option of rewinding the program to find the actual starting time, or possibly moving forward to find the actual starting time. The user is permitted to rewind to an earliest time defined by the padded starting time $T_s-T_p$.

The procedure 900 thus provides a manual technique that allows users to find the actual starting time of a program. The technique potentially creates a better experience than known techniques (which start the program at the padded starting time $T_s-T_p$). This is because a program is most likely to start at the EPG-specified scheduled time $T_s$, thus eliminating the need for the user to scan backward or forward for the majority of cases. At the same time, the padding interval defined by $T_p$ has been captured, which still gives the user the option of advancing to an earlier starting time if this is required.

The procedure 900 can be combined with the procedures shown in the preceding figures. In this case, the user's actions in advancing to an earlier starting time (rather than $T_s$) can be monitored by the OC EPF 220, and used to formulate modified playback decisions. These modified playback decision can include instructions to start the program at a starting point which is more closely aligned with the actual starting point of the program.

In closing, a number of features were described herein by first identifying exemplary problems that these features can address. This manner of explication does not constitute an admission that others have appreciated and/or articulated the problems in the manner specified herein. Appreciation and articulation of the problems present in the relevant arts are to be understood as part of the present invention. More specifically, there is no admission herein that the features described in the Background section of this disclosure constitute prior art. Further, the description of a limited set of problems in the Background section does not limit the application of invention to solving only those problems; it can be applied to problems and environments not expressly identified herein. Further, the subject matter set forth in the Summary section and the Abstract of this disclosure do not limit the subject matter set forth in the claims.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for governing a playback of a program, comprising:
receiving, by a computing device and from one or more authorities representing one or more individuals authorized to generate actual event data, the actual event data defining a manner in which the program has been presented,
the actual event data being formed based on a playback of at least part of the program on at least one prior occasion and a manner in which the program is archived,
the manner in which the program is archived relating to archiving content that corresponds to a particular duration of time of the program by the one or more authorities;
forming, by the computing device, modified playback decisions based on the actual event data;
and using, by the computing device, the modified playback decisions to automatically modify the program for a subsequent presentation.

2. The method of claim 1, wherein the actual event data reflects an aggregate behavior of a population of users as the users consume the program.

3. The method of claim 1, wherein the modified playback decisions identify an assessed actual starting time at which the program commences.

4. The method of claim 1, wherein the modified playback decisions identify an assessed actual ending time at which the program ends.

5. The method of claim 1, wherein the modified playback decisions identify any temporal-related deviations from a normal 1× playback mode during the program.

6. The method of claim 5, wherein a deviation from the normal 1× playback mode corresponds to at least one portion of the program to be skipped over.

7. The method of claim 5, wherein a deviation from the normal 1× playback mode corresponds to any one or more of: an activation of an accelerated forward mode; an activation of a rewind mode; or an activation of a pause mode.

8. The method of claim 1, wherein the modified playback decisions identify any program-independent features that define a manner in which the program is to be presented.

9. The method of claim 8, wherein the program independent features correspond to any one or more of: a manner in which a visual component of the program is presented; a manner in which an audio component of the program is presented; or a manner in which supplemental features are added to any audio and/or video component of the program.

10. One or more machine-readable media containing machine-readable instructions for implementing the method of claim 1.

11. Functionality comprising logic configured to implement the method of claim 1.

12. A method for governing a playback of a program, comprising:
recording, by a client device, a program based on initial playback decisions performed by one or more authorities, the one or more authorities representing one or more individuals authorized to generate initial playback decisions;
providing, by the client device and based on the initial playback decisions performed by the one or more authorities, modified playback decisions that define a manner in which the program should actually be presented,
the modified playback decisions being formed based on a playback of at least part of the program on at least one prior occasion by at least one authority of the one or more authorities
and based on a time in which the playback of the program typically occurred for a group of users; making, by the client device, a modification that affects a subsequent playback of the program in accordance with the modified playback decisions; and increasing, by the client device, a visibility of the program at a subsequent time corresponding to one or more previous times during which the group of users initiated playback of the program or a related program after the program or the related program was initially recorded.

13. The method of claim 12, wherein the modification includes bookmarking the program based on the modified playback decisions.

14. The method of claim 12, wherein the modification includes truncating the program based on the modified playback decisions.

15. The method of claim 12, further comprising giving a user an option to perform or not perform the modification, and making the modification if the user opts to perform the modification.

16. One or more machine-readable media containing machine-readable instructions for implementing the method of claim 12.

17. Functionality comprising logic configured to implement the method of claim 12.

18. A method for governing a playback of a program, comprising:
recording, by a client device, a program based on initial playback decisions performed by one or more authorities, the one or more authorities representing one or more individuals authorized to generate initial playback decisions; providing, by the client device and based on the initial playback decisions performed by the one or more authorities,
modified playback decisions that define a manner in which the program should actually be presented, the modified playback decisions being formed based at least in part on a manner in which the program is archived,
the manner in which the program is archived relating to archiving a particular segment of the program that corresponds to a first duration of time that is shorter than a second duration of time associated with an entirety of the program;
and making, by the client device, a modification to the recorded program that affects the playback of the recorded program in accordance with the modified playback decisions.

* * * * *